United States Patent
Kahn et al.

(10) Patent No.: US 12,483,935 B2
(45) Date of Patent: Nov. 25, 2025

(54) 5GS CLASSIFICATION OF PACKETS OF A TRAFFIC FLOW

(71) Applicant: Nokia Technologies Oy, Espoo (FI)

(72) Inventors: Colin Kahn, Morris Plains, NJ (US); Markus Sakari Isomäki, Espoo (FI); Devaki Chandramouli, Texas, TX (US)

(73) Assignee: Nokia Technologies Oy, Espoo (FI)

( * ) Notice: Subject to any disclaimer, the term of this patent is extended or adjusted under 35 U.S.C. 154(b) by 308 days.

(21) Appl. No.: 17/657,075

(22) Filed: Mar. 29, 2022

(65) Prior Publication Data
US 2023/0319638 A1 Oct. 5, 2023

(51) Int. Cl.
*H04W 28/10* (2009.01)
*H04L 47/2441* (2022.01)
*H04W 28/02* (2009.01)

(52) U.S. Cl.
CPC ......... *H04W 28/10* (2013.01); *H04L 47/2441* (2013.01); *H04W 28/0268* (2013.01)

(58) Field of Classification Search
None
See application file for complete search history.

(56) References Cited

U.S. PATENT DOCUMENTS

| | | |
|---|---|---|
| 8,165,024 B2 | 4/2012 | Dolganow et al. |
| 8,264,965 B2 | 9/2012 | Dolganow et al. |
| 2023/0164081 A1* | 5/2023 | Rossbach .......... H04W 28/0263 370/235 |
| 2023/0224383 A1* | 7/2023 | Wang .................... H04L 69/321 709/224 |
| 2023/0247476 A1* | 8/2023 | Chun .................. H04L 65/1073 370/235 |
| 2023/0300667 A1* | 9/2023 | Baek ................. H04W 28/0268 370/328 |
| 2023/0309100 A1* | 9/2023 | Baek ................. H04W 28/0268 |

OTHER PUBLICATIONS

"3rd Generation Partnership Project; Technical Specification Group Services and System Aspects; System architecture for the 5G System (5GS); Stage 2 (Release 17)", 3GPP TS 23.501, V17.3.0, Dec. 2021, pp. 1-559.

(Continued)

*Primary Examiner* — Asad M Nawaz
*Assistant Examiner* — Najeeb Ansari
(74) *Attorney, Agent, or Firm* — Nokia Technologies Oy

(57) ABSTRACT

A method may include receiving, by a traffic ingress entity of a communication network, one or more packets of a traffic flow. The method may also include assigning a classification, by the data reception entity, to each packet of the one or more packets of the traffic flow according to one or more protocol data unit sets to which the packet belongs to. The method may further include mapping the one or more packets of the traffic flow to one or more quality of service flows for quality of service handling of the one or more packets based on the classification assigned to each packet. In addition, the method may include outputting the classification assigned to each packet to a network element for enabling quality of service handling of the one or more packets based on the mapping and one or more quality of service information.

13 Claims, 7 Drawing Sheets

(56) References Cited

OTHER PUBLICATIONS

"3rd Generation Partnership Project; Technical Specification Group Services and System Aspects; Procedures for the 5G System (5GS); Stage 2 (Release 17)", 3GPP TS 23.502, V17.3.0, Dec. 2021, pp. 1-727.

"Key Issue for QoS framework enhancement based on media unit", SA WG2 Meeting #149e, S2-2201065, Agenda: 9.19, Nokia, Feb. 14-25, 2022, pp. 1-3.

"New Key Issue: PDU Set integrated packet handling", 3GPP TSG-WG SA2 Meeting #149E e-meeting, S2-2201808, Agenda: 9.19, Huawei, Feb. 14-25, 2022, pp. 1-2.

Zanaty et al., "Frame Marking RTP Header Extension draft-ietf-avtext-framemarking-13", Internet-Draft, Network Working Group, Nov. 2021, pp. 1-15.

"Advanced Video Coding for Generic Audiovisual services", Series H: Audiovisual And Multimedia Systems, Infrastructure of audio-visual services—Coding of moving Video, Recommendation ITU-T H.264, Apr. 2017, 812 pages.

"3rd Generation Partnership Project; Technical Specification Group Services and System Aspects; Study on XR (Extended Reality) and media services (Release 18)", 3GPP TR 23.700-60, V0.1.0, Feb. 2022, pp. 1-16.

"Solution proposal: PDU Set integrated packet handling", 3GPP SA WG2 Meeting #150E, S2-XXXXX, Agenda: XX, Nokia, Apr. 6-12, 2022, pp. 1-6.

\* cited by examiner

| Level | Field in GTP-U Extension Header | Example Assigned Media Types (values and definition) | Example Packet Marking (Media Type indication) | Interpretation of Example Packet Type |
|---|---|---|---|---|
| 1 | PDU Set #1 (Media Frame) | 1 = I-Frame<br>2 = P-Frame | 1 | I-Frame |
| 2 | PDU Set #2 (Set of Media Frames) | 1 = Group of Pictures | 1 | GOP |
| 3 | PDU Set #3 | Temporal Layers:<br>1 = Base Layer<br>2 = Enhancement Layer 1<br>3 = Enhancement Layer 2 | 3 | Temporal Enhancement Layer #2 |
| 4 | PDU Set #4 | Spatial Layers:<br>1 - Base Layer<br>2 - Enhancement Layer 1<br>3 - Enhancement Layer 2 | 1 | Spatial Base Layer |
| 5 | PDU Set #5 | Application:<br>1 = MPEG-4 video<br>2 = AAC Audio | 1 | MPEG-4 Video |

FIG. 3

|  | PDU Set #1 (Frame Type) | PDU Set #2 (Set of Frames) | PDU Set #3 (Media Layer 1) | PDU Set #4 (Media Layer 2) | PDU Set #N | PDU Set #5 (Application Type) |
|---|---|---|---|---|---|---|
| Media Type #1 | -2 | - | -2 | -1 |  | +1 |
| Media Type #2 | +2 |  | 0 | +1 |  | -1 |
| Media Type #3 |  |  | +1 | +2 |  |  |
| Media Type #4 |  |  |  |  |  |  |
| ...... |  |  |  |  |  |  |

FIG. 4

5GS CLASSIFICATION OF PACKETS OF A TRAFFIC FLOW

FIELD

Some example embodiments may generally relate to mobile or wireless telecommunication systems, such as Long Term Evolution (LTE) or fifth generation (5G) new radio (NR), or 5G beyond, or other telecommunications systems. For example, certain example embodiments may relate to apparatuses, systems, and/or methods for classification of packets of a traffic flow for application, such as extended reality (XR) applications.

BACKGROUND

Examples of mobile or wireless telecommunication systems may include the Universal Mobile Telecommunications System (UMTS), Long Term Evolution (LTE), LTE-Advanced (LTE-A), LTE-A Pro, and/or fifth generation (5G) or new radio (NR) telecommunications systems. Fifth generation (5G) telecommunications systems refer to the next generation (NG) of radio access networks and network architectures for core networks. A 5G telecommunication system is mostly based on new radio (NR) radio access technology (5G NR), but a 5G (or NG) network can also build on E-UTRAN. It is estimated that 5G NR will provide bitrates on the order of 10-20 Gbit/s or higher, and will support at least enhanced mobile broadband (eMBB) and ultra-reliable low-latency communication (URLLC) as well as massive machine-type communication (mMTC). 5G NR is expected to deliver extreme broadband and ultra-robust, low-latency connectivity and massive networking to support the Internet of Things (IoT).

SUMMARY

Some example embodiments may be directed to a method. The method may include receiving, by a traffic ingress entity of a communication network, one or more packets of a traffic flow. The method may also include assigning a classification, by the traffic ingress entity, to each of the one or more packets of the traffic flow according to one or more protocol data unit sets to which the packet belongs to. The method may further include mapping the one or more packets of the traffic flow to one or more quality of service flows for quality of service handling of the one or more packets based on the classification assigned to each packet. In addition, the method may include outputting the classification assigned to each packet to a network element for enabling quality of service handling of the one or more packets based on the mapping and one or more quality of service information. In some embodiments, the traffic ingress entity may be a user equipment, a user plane function, or an apparatus that includes a user plane function.

Other example embodiments may be directed to an apparatus. The apparatus may include at least one processor and at least one memory including computer program code. The at least one memory and computer program code may also be configured to, with the at least one processor, cause the apparatus at least to receive one or more packets of a traffic flow. The apparatus may also be caused to assign a classification, by the traffic ingress entity, to each packet of one or more packets of the traffic flow according to one or more protocol data unit sets to which the packet belongs to. The apparatus may further be caused to map the one or more packets of the traffic flow to one or more quality of service flows for quality of service handling of the one or more packets based on the classification assigned to each packet. In addition, the apparatus may be caused to output the classification assigned to each packet to a network element for enabling quality of service handling of the one or more packets based on the mapping and one or more quality of service information. In some embodiments, the apparatus may be a user equipment, may be implemented in user equipment, or may be part of a core network and implement a user plane function.

Other example embodiments may be directed to an apparatus. The apparatus may include means for receiving one or more packets of a traffic flow. The apparatus may also include means for assigning a classification, by the traffic ingress entity, to each packet of the one or more packets of the traffic flow according to one or more protocol data unit sets to which the packet belongs to. The apparatus may further include means for mapping the one or more packets of the traffic flow to one or more quality of service flows for quality of service handling of the one or more packets based on the classification assigned to each packet. In addition, the apparatus may include means for outputting the classification assigned to each packet to a network element for enabling quality of service handling of the one or more packets based on the mapping and one or more quality of service information.

In accordance with other example embodiments, a non-transitory computer readable medium may be encoded with instructions that may, when executed in hardware, perform a method. The method may include receiving, by a traffic ingress entity of a communication network, one or more packets of a traffic flow. The method may also include assigning a classification, by the data reception entity, to each packet of the one or more packets of the traffic flow according to one or more protocol data unit sets to which the packet belongs to. The method may further include mapping the one or more packets of the traffic flow to one or more quality of service flows for quality of service handling of the one or more packets based on the classification assigned to each packet. In addition, the method may include outputting the classification assigned to each packet to a network element for enabling quality of service handling of the one or more packets based on the mapping and one or more quality of service information.

Other example embodiments may be directed to a computer program product that performs a method. The method may include receiving, by a traffic ingress entity of a communication network, one or more packets of a traffic flow. The method may also include assigning a classification, by the data reception entity, each packet of the one or more packets of the traffic flow according to one or more protocol data unit sets to which the packet belongs to. The method may further include mapping the one or more packets of the traffic flow to one or more quality of service flows for quality of service handling of the one or more packets based on the classification assigned to each packet. In addition, the method may include outputting the classification assigned to each packet to a network element for enabling quality of service handling of the one or more packets based on the mapping and one or more quality of service information.

Other example embodiments may be directed to an apparatus that may include circuitry configured to receive one or more packets of a traffic flow. The apparatus may also include circuitry configured to assign a classification, by the data reception entity, to each packet of the one or more packets of the traffic flow according to one or more protocol data unit sets to which the packet belongs to. The apparatus may further include circuitry configured to map the one or more packets of the traffic flow to one or more quality of service flows for quality of service handling of the one or more packets based on the classification assigned to each packet. In addition, the apparatus may include circuitry configured to output the classification assigned to each packet to a network element for enabling quality of service handling of the one or more packets based on the mapping and one or more quality of service information.

BRIEF DESCRIPTION OF THE DRAWINGS

For proper understanding of example embodiments, reference should be made to the accompanying drawings, wherein:

FIG. 3 illustrates a table of an example general packet radio system (GPRS) tunneling protocol user plane (GTP-U) extension header with PDU set classification marking for a packet, according to certain example embodiments.

FIG. 4 illustrates an example priority level adjustment information for MPEG-4 video, according to certain example embodiments.

DETAILED DESCRIPTION

Figure 1:
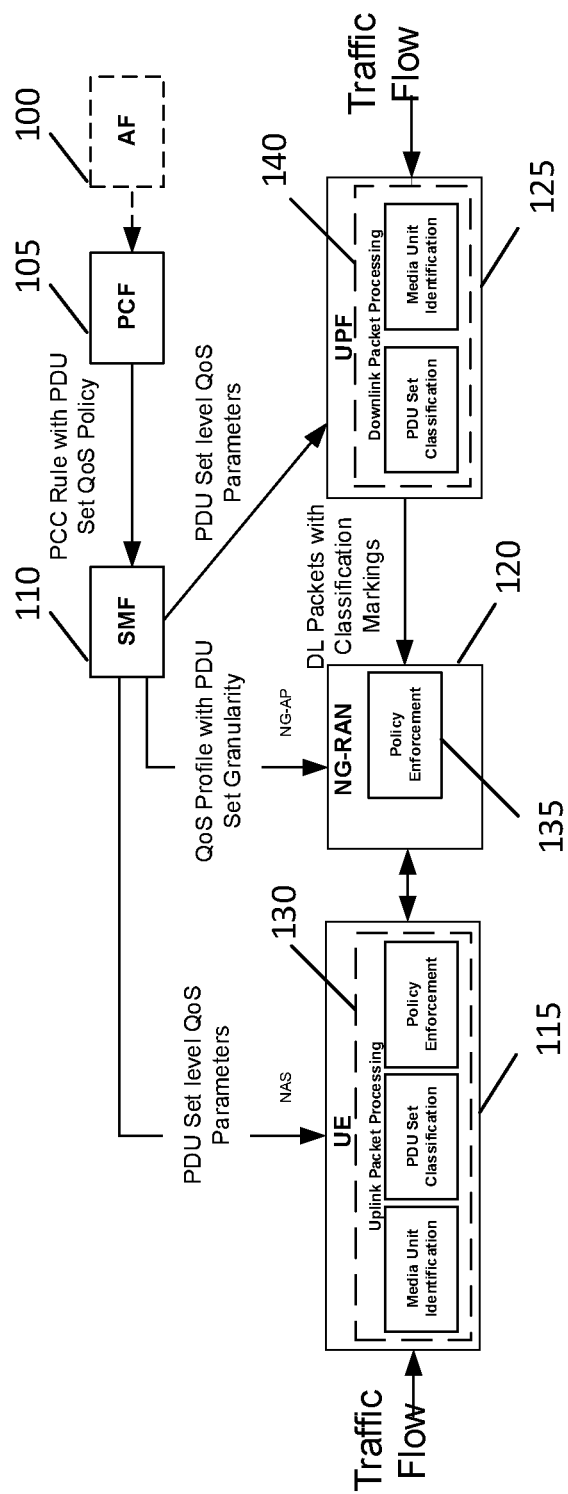
FIG. 1 illustrates an example 5GS support logic for protocol data unit (PDU) set integrated packet handling, according to certain example embodiments.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for 5GS policy for XR.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

The technical standards of the 3$^{rd}$ Generation Partnership Project (3GPP) describe enhancements for quality of service (QoS) for extended reality (XR) services in 5G telecommunication systems (5GS). However, the current technical standards of 3GPP do not provide a mechanism for classifying packets received at the 5GS in XR. Thus, as described herein, certain example embodiments of apparatuses, systems, and/or methods for classification of packets of a traffic flow for application may relate to integrated handling of one or more packets that make up a PDU set for XR applications in 5GS. For instance, these example embodiments may classify packets (e.g., of an IP traffic flow/QoS flow at the UE, UPF, or external function) to associate the packet with PDU sets to which they belong. As discussed herein, each packet may be marked with packet markings (i.e., indicators) that represent the packet's classification to enable PDU set integrated packet handling by a network element such as, for example, a next generation radio access network (NG-RAN) of the 5GS. According to certain example embodiments, the packet markings in each packet may convey application information needed to support per-packet QoS treatment in the 5GS (i.e., 5G core network).

3GPP provides support for transmission for multi-modality traffic flows with a single UE. Some advanced XR or media services may include multiple types of traffic flows that may include packets. For instance, the packets may be for a video stream, an audio stream, or haptic or sensor data for a more immersive experience. Different types of data of one application may be located at one UE, and there may be multiple types of devices that support haptic and/or kinaesthetic modalities, and these devices may connect via a wired connection to a single UE that can access the 5GS. Thus, there may be certain ways to enhance 5GS to provide better support of the coordinated transmission of traffic flows, which can be mapped to one or more QoS flows.

Currently, 5GS may provide support for applying third party requests for treatment of traffic flows associated with one or more applications. The requests may include, for example, an identifier of a set of UEs, a set of UEs and traffic flows, and the expected QoS handling of the traffic flow and associated 5GS triggering events. 5GS triggering events may provide feedback and may be used by applications for coordination of the transmission of multiple UEs' flows or to alter the transmission of a single UE.

The interaction between applications at a UE and a 5GS may be needed to reduce latency, reduce congestion, and ensure desired experience for end users. A server hosting an application (i.e., an application server), such as a server hosting an XR application (i.e., an XR application server), may adjust a traffic rate of a traffic flow to adapt to network conditions in the 5GS and ensure desired experience for a user of the application. Additionally, in current 5GS, a QoS flow may represent the finest granularity of QoS differentiation in a PDU session. The 5G QoS characteristics may be determined by the 5G QoS identifier (5QI), which may imply that each packet in a QoS flow may be treated to the same QoS requirements.

For XR/media services, a group of packets may be used to carry payloads of a PDU set (e.g., a frame, video slice/tile within media traffic flow). A PDU set may be composed of one or more packets (e.g., containing a frame or video slice for XRM services), which should be handled in an integrated manner in the 5GS.

Packets that comprise a PDU set may be decoded/handled as a whole. For example, a frame or slice of a video (i.e. a video slice) may only be decoded in a case when all the packets of a traffic flow carrying the frame or video slice are successfully delivered. A frame within a group of pictures (GOP) may be decoded by the UE when all the frames on which that frame depends are successfully received by the UE. Thus, the groups of packets within the PDU set may have inherent dependency on each other. Accordingly, if such dependencies between the packets are not considered, 5GS may perform a scheduling with low efficiency. For instance, the 5GS may randomly drop a packet but try to deliver other packets of the same frame or video slice which are useless to the client without the dropped packet and, thus, waste radio resources. Thus, to remedy this issue, certain example embodiments may consider such dependency between packets of a PDU set to enhance efficiency and improve user experience. In this regard, the packets that comprise a frame or video slice may be considered a PDU set, and those packets need to be handled in an integrated manner rather than individually. Other example embodiments may consider ways to enhance the QoS model and policy control for PDU set integrated packet handling, to augment information provided to the RAN and/or UPF to support PDU set integrated packet handling in both the downlink (DL) and uplink (UL) direction, and how to provide information to the UE for PDU set integrated packet handling.

In consideration of the above challenges, in certain example embodiments, a UE or a user plane function (UPF) of a 5G core network (5GC) may receive packets of a traffic flow and classify the packets of the traffic flow according to the PDU sets to which they belong to generate a classification for each packet. For example, the classification may be conveyed within the 5GS (e.g., from the UPF to the NG-RAN via markings in a GTP-U header extension). In certain example embodiments, the classification may capture media layer attributes that may potentially impact QoS treatment of the packets of the traffic flow. As described above, this may include dependence of packet treatment on the successful handling of other packets. For example, this may relate to the treatment of a packet carrying a P-Frame that is dependent on the successful handling of packets carrying an I-Frame, or treatment of a packet carrying an enhancement layer that is dependent on the successful handling of packets carrying a base layer. In some cases, classification of the packets may be needed so that the packet markings indicating classification may be conveyed in the 5GS (e.g., from the UPF to the NG-RAN for DL packets).

Certain example embodiments may also define PDU sets so that they can be applicable to different applications such as, for example, H-264/MPEG-4 video or AAC audio at multiple levels such as per-frame (e.g., P-Frames/I-Frames), and per-layer (e.g., temporal base layer and enhancement layers, spatial base layer and enhancement layers, etc.). Note, base layers may provide temporal and spatial media that can be independently decoded and rendered while the one or more enhancement layers may provide incremental data to enhance temporal or spatial media quality. Use by the application of an enhancement layer is dependent on receiving the corresponding base layer and may be dependent on receiving another, lower level enhancement layer. In this sense, packets associated with temporal or spatial layers may belong to a PDU set that requires integrated packet handling. In some instances, a packet may belong to PDU sets in more than one level. For example, it may be possible to treat a packet carrying an I-Frame fragment for a temporal and spatial base layer differently from a packet carrying an I-Frame fragment for a temporal or spatial enhancement layer, and different from a packet carrying a P-Frame fragment in those same layers.

According to certain example embodiments, for enhanced QoS policy in the 5GS, how packets are treated may be based on a QoS policy determined at a policy control function (PCF) of a core network of the 5GS. According to certain example embodiments, treatment of a packet means that the packet is provided with a certain QoS, for example a certain priority, that is different from other packets in the same QoS flow. While packet classification markings indicate PDU set associations and media unit properties (e.g., indicating that the packet carries a fragment of an I-Frame from a spatial enhancement layer that is dependent on a base layer for an H264 video stream), they do not specify how the packet is treated in the 5GS. Thus, to align with the current 5GS QoS framework, QoS policy may be enhanced by providing PDU set granularity QoS information, which may indicate how the packet should be treated. For example, rather than having a policy that provides a single set of QoS parameters for all packets in the QoS flow as is currently the case for 5GS QoS, the policy may specify certain QoS parameters that stipulate how packets are treated per-PDU set media type. As further described below and illustrated in FIG. 1, the enhanced policy information may be sent to the SMF in a PCC rule and promulgated to the NG-RAN, UE, and UPF.

While classification of packets may be used to convey media information within the 5GS, media unit identification may provide the characterization of the packets necessary to perform classification. For instance, media unit identification may provide media specific information (i.e., the type of frame (I-frame vs P-frame, the temporal or spatial layer associated with the packet), the application conveyed by the packet, etc.) necessary for classification of packets according to the PDU sets to which the packets belong. Additionally, media unit identification may utilize techniques such as deep packet inspection (DPI), examination of real-time transport protocol (RTP) extension headers, and artificial intelligence (AI)/machine-learning (ML) to determine the media units associated with a packet. While classification describes media units associated with a packet, the treatment (i.e., the QoS provided such as, for example the priority provided to the packet) by the 5GS of a classified packet may be based on certain policy(ies) as conveyed from the PCF via expanded policy and charging control (PCC) rules. The enhanced policy may map the packet classification marking to a treatment in the 5GS.

Additionally, the media unit identification may utilize techniques such as DPI, examination of RTP extension headers, and AI/ML to determine the media units associated with a packet. Media unit identification may further be provided at the UE (e.g., for UL), the UPF (e.g., for DL), or by functions external to the UE and UPF such as chained service functions, proxies or gateways operating in the network or other functions that perform DPI. Optionally, in other example embodiments, assistance information describing media and traffic characteristics not required per-packet such as number of temporal and spatial media layers, GOP size, temporal and special layer periodicities, etc., may be separately requested by an AF or configured.

To support PDU set integrated packet handling, certain example embodiments may provide the decomposition and mapping of certain functionalities. For instance, FIG. 1 illustrates an example 5GS support logic for PDU set integrated packet handling, according to certain example embodiments. As illustrated in FIG. 1, application function (AF) 100, which as described above may provide assistance information describing media and traffic characteristics not required per-packet such as number of temporal and spatial media layers, GOP size, temporal and special layer periodicities, and also may request the 5GS to provide QoS for a media flow. The AF 100 may also be in communication with the PCF 105. As noted above, the PCF 105 may generate the enhanced policy/QoS policy corresponding to the classifications of the packets. Once the policy(ies) is generated, it may be forwarded to the SMF in a PCC rule, and may be further promulgated to the UE 115 via the non-access stratum (NAS) signaling over the 3GPP N1 interface, to the NG-RAN 120 via next generation application protocol (NG-AP) signaling over the 3GPP N2 interface, and to the UPF 125 via Packet Forwarding Control Protocol (PFCP) signaling over the 3GPP N4 interface. As illustrated in FIG. 1, the UE 115 may include an UL packet processing unit 130 that may include functionalities of media unit identification, PDU set classification, and policy enforcement. In certain example embodiments, the UE may send the classification markings to the NG-RAN in a radio interface header (e.g., PDCP/SDAP layer header) so that the NG-RAN can further prioritize the handling of received packets. Additionally, the NG-RAN 120 may send the classification markings to the UE in a radio interface header (e.g., PDCP/SDAP layer header) so that the UE can further prioritize the handling of the received packets. In other example embodiments, the NG-RAN 120 may include a policy enforcement function 135, and the UPF may include a DL packet processing unit 140 that may include functionalities of PDU set classification and media unit identification. As to the policy enforcement, the PDU set level packet treatment in the NG-RAN 120 and the UE 115 may be achieved by matching PDU set packet classification markings with the enhanced policy QoS information provided in the QoS profile and PDU set level QoS.

Certain example embodiments may also provide support for building upon 5GS architecture, including, for example, existing signaling for PCC rules, QoS profile, and QoS flow level QoS parameters. For instance, the core network of the 5GS may provide the UE with one or more QoS flow descriptions associated with a PDU session at PDU session establishment or at PDU session modification. A QoS flow description associated with a PDU session may include a QoS flow identifier (QFI). Further, if the QoS flow is a guaranteed bit rate (GBR) QoS flow, the QoS flow description associated with a PDU session may include a guaranteed flow bit rate (GFBR) for UL, a BFBR for DL, a maximum flow bit rate (MFBR) for UL, a MFBR for DL, and optionally averaging window, applicable for both UL and DL. A QoS flow description associated with a PDU session may further include 5QI if the QFI is not the same as the 5QI of the QoS flow identified by the QFI, and optionally an evolved packet system (EPS) bearer identity (EBI) if the QoS flow associated with a PDU session can be mapped to an EPS bearer.

Figure 2:
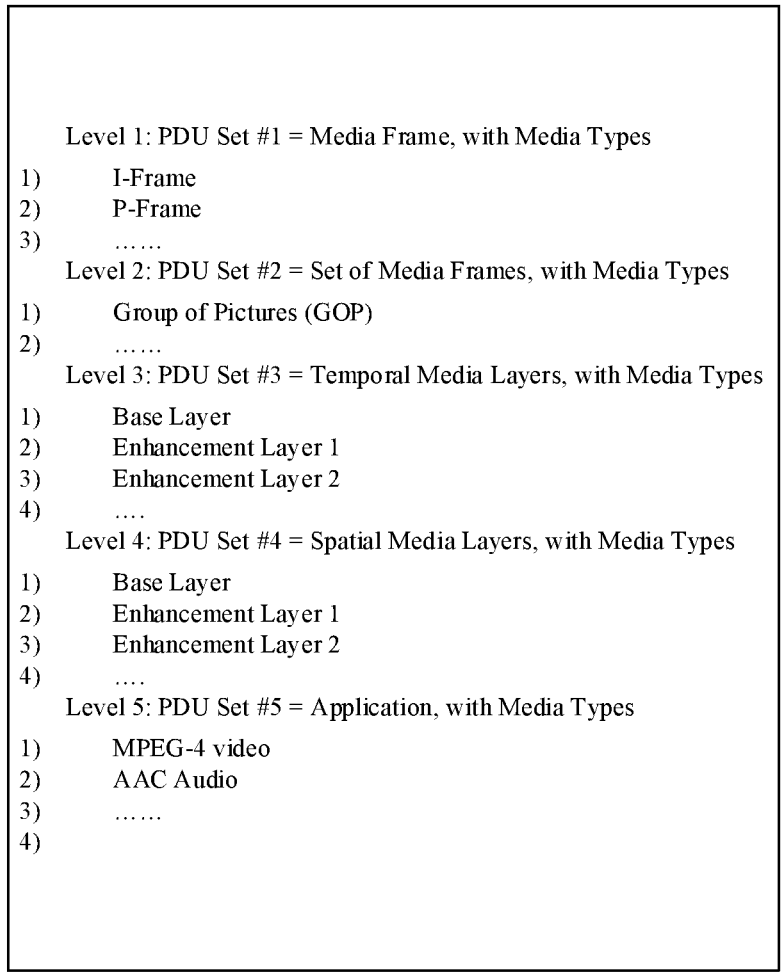
FIG. 2 illustrates an example table of GTP-U extension header with PDU set classification marking for a packet, according to certain example embodiments.

FIG. 2 illustrates an example PDU set for each level and media type for MPEG-4/H264 video, according to certain example embodiments. In particular, according to certain example embodiments, packets may be classified as belonging to a media type(s) of one or more PDU sets that have the levels described above. In certain example embodiments, the media type represented at each level may be defined via configuration as illustrated, for example, in FIG. 2.

FIG. 3 illustrates an example table of PDU set classification used to generate markings for a GTP-U extension header for a packet, according to certain example embodiments. As described above, in certain example embodiments, a group of packets belonging to a same PDU set may be handled in an integrated manner. For instance, packets associated with the same PDU set may be handled in an "integrated manner" meaning that there is some interdependence on how the packets are handled ("handled" meaning the QoS that is provided (e.g., the priority give to the packet).

Additionally, a PDU set classification for a packet includes information that identifies the PDU sets that the packet belongs to and information that identifies types within the PDU sets that are associated with the packet. There may be more than one PDU set to which a packet may be associated, and hence the PDU sets may be for different "Levels". For example, packets carrying I-Frames and associated P-Frames should be handled in an "integrated manner". Hence there may be a Media Frame/Slice PDU set that may be called level 1 that identifies a packet as carrying an I-Frame or P-Frame. In certain example embodiments, temporal base and enhancement layers for video may be handled in an "integrated manner". Hence there may be a temporal PDU set that may be called level 3 PDU set that identifies a packet as being associated with a temporal base layer or a particular enhancement layer. Additionally, in media streams, groups of packets may be handled in an integrated manner may occur at different levels. These levels may include level 1 corresponding to a PDU set of a media frame, level 2 corresponding to a PDU set of a media frame set, level 3 corresponding to a level "N" PDU set of high level media frame sets, and level N+1 PDU set corresponding to an application type.

In level 1, packets that include fragments of a media frame (e.g., an I-Frame or a P-Frame) may be handled in an integrated manner since, for example, only be sending both packets can the frame be successfully decoded. In level 2, packets that include a set of media frames (e.g., an I-Frame and associated P-Frames that constitute a GOP) may be handled in an integrated manner. In this example, packets that include an I-Frame must be successfully sent for associated P-Frame packets to be of value to the decoder.

In level 3, larger groups of packets may include higher level media units that are processed in an integrated manner (e.g., as a PDU set). For example, packets that include a temporal base layer or a temporal enhancement layer may be processed in an integrated manner (e.g., as a PDU set). Similarly spatial base versus enhancement layers may include a PDU set, as may video slices that form spatially distinct views.

In level N+1 PDU set, the 5GS QoS flows may carry multiple traffic flow instances of the same type (e.g., two MPEG-4 video flows), as well as traffic flow instances of different types (e.g., MPEG-4 video and AAC audio). Therefore packets of distinct traffic flows that are mapped to the same QoS flow may be identified via a PDU set and handled in an integrated manner. Furthermore, configuration of lower levels may be a function of Application Type. For example while a MPEG-4 video stream may have a PDU Set to identify I-Frames and associated P-Frames, a different PDU set may be used for an Audio Stream.

FIG. 3 illustrates a table of an example general packet radio system (GPRS) tunneling protocol user plane (GTP-U) extension header with PDU set classification marking for a packet, according to certain example embodiments. According to certain example embodiments, in the UPF, PDU-set GTP-U extension header fields may convey the results of classification to the NG-RAN. In some example embodiments, an individual packet may be a member of multiple PDU sets. For example, a packet from an MPEG-4 video flow identified as carrying an I-Frame fragment for a GOP in the temporal enhancement layer 2 and a spatial base layer may be marked in GTP-U header fields defined for the levels illustrated in FIG. 3. In another example embodiment, the classification assigned to a given packet may identify the PDU set(s) the given packet belongs to, and it may also identify the packet's membership in the PDU set(s). For instance, the "Level 1" PDU set may be "media Frame", and the membership may be "I-Frame" or "P-Frame". However, the example embodiments described herein are not limited to MPEG-4 video. Instead, other example embodiments may involve other media types by assigning alternative definitions for PDU sets at the PCF and UPF/UE.

According to certain example embodiments, packets may be classified according to PDU sets to which they belong. As such, differentiated QoS that considers PDU set importance may be applied according to policy conveyed from the PCF. As described above, groups of packets may be handled according to various priority levels. A priority level may indicate a priority in scheduling resources among QoS flows. For instance, it may be assumed that each QoS flow is assigned a pre-configured or standardized priority level, or a priority level for the QoS flow is signaled over NGAP. This may correspond to the reference priority level for all the packets within the QoS flow. Further, the lowest priority level value may correspond to the highest priority, and the highest priority level value may correspond to the lowest priority.

According to certain example embodiments, the priority level may be used to differentiate between QoS flows of the same UE, and may be used to differentiate between QoS flows from different UEs. In the case of congestion, when QoS requirements cannot be fulfilled for one or more QoS flows, the priority level may be used to select for which QoS flow(s) the QoS requirements are prioritized such that a QoS flow with priority level value N is prioritized over QoS flows with higher priority level values (e.g., N+1, N+2, etc.). However, in the case of no congestion, the priority level may be used to define the resource distribution between QoS flows. In addition, a scheduler may prioritize QoS flows based on other parameters such as, for example, resource type and/or radio condition, in order to optimize application performance and network capacity.

FIG. 4 illustrates an example priority level adjustment information for MPEG-4 video, according to certain example embodiments. In certain example embodiments, the priority level adjustment may be performed in the NG-RAN for DL packets, and in the UE for UL packets. In other example embodiments, to vary priority according to how a packet is classified, a per-packet adjustment to the reference priority level may be determined according to new priority level adjustment information provided in QoS information that is pre-configured, associated with a standardized 5QI or sent from the PCF to the NG-RAN, SMF/UPF, and/or UE. The priority level adjustment information may include per PDU set type adjustments to the reference priority level. In addition, for each PDU set type to which a packet belongs, the priority level adjustment information may provide a value that is added to the reference priority. Thus, the resultant sum for all adjustments to the reference priority may determine the priority of the packet.

Referring to the example of FIG. 4, a standardized 5QI=89 (visual content for cloud/edge/split rendering) with a default (reference) priority=25 may be selected to transport MPEG-4 video. In this example, the priority level adjustment information provided to the NG-RAN corresponding to the packet classification may be illustrated in FIG. 4 where a reduced priority level means a higher priority. Further, packets received at the NG-RAN with classification markings may have their priority adjusted according to the PDU sets and media types to which they are associated. For instance, if the reference priority level is 25, PDUs classified as Type #1 in PDU Set #1 may have their priority level decreased by "2".

As further illustrated in FIG. 4, the QoS flow reference priority level=25 may be decreased by 2 if the packet carries an I-Frame (PDU Set #1, Media Type #1), increased by 1 if the packet carries a temporal enhancement layer 2 (PDU Set #3, Media Type #3), decreased by 1 if it is in the base spatial layer (PDU Set #4, Media Type #1), and increased by 1 because it is an MPEG-4 video application (PDU Set #5, Media Type #1). Thus, the resultant priority for the example packet is 24. According to certain example embodiments, the table of FIG. 4 may be provided to the UPF, NG-RAN, and/or UE, for example, in an expanded QoS profile so that the UPF, RAN, and/or UE can treat packets with corresponding classification markings with the appropriate priority.

Figure 5:
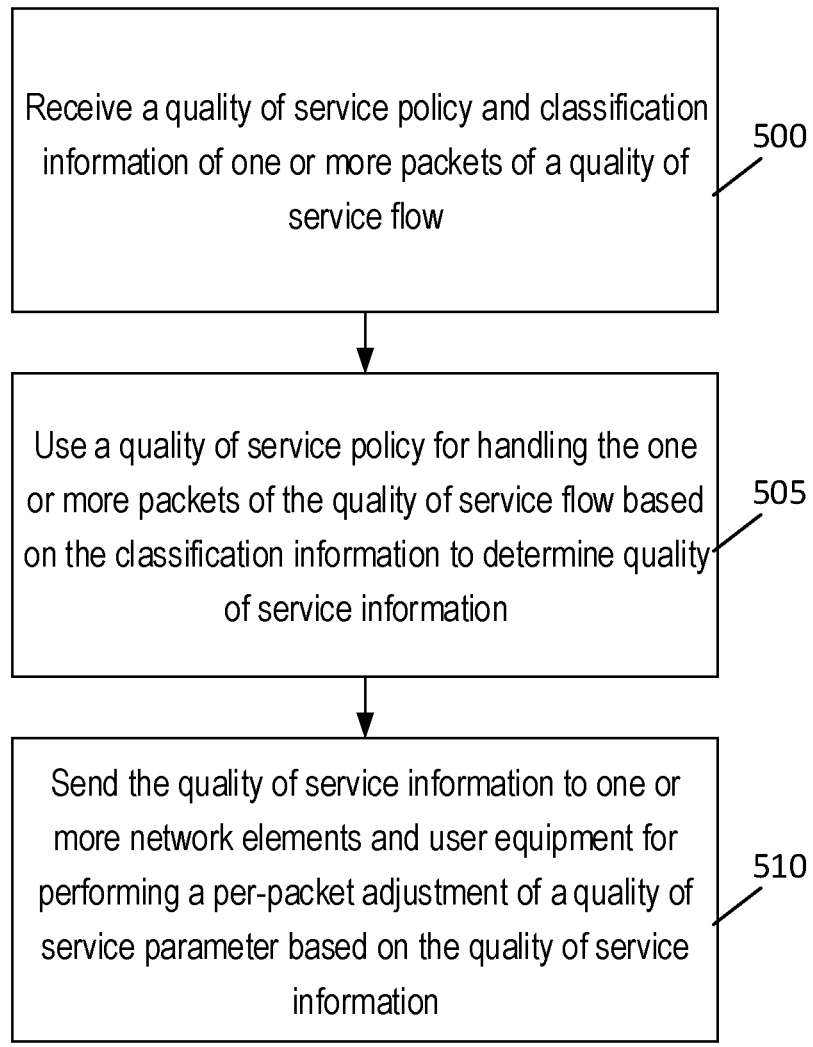
FIG. 5 illustrates an example flow diagram of a method, according to certain example embodiments.

FIG. 5 illustrates an example flow diagram of a method, according to certain example embodiments. In an example embodiment, the method of FIG. 5 may be performed by a network entity, or a group of multiple network elements in a 3GPP system, such as LTE or 5G-NR. For instance, in an example embodiment, the method of FIG. 5 may be performed by a core network entity such as, for example, a SMF or PCF, or a device similar to one of apparatuses 10 or 20 illustrated in FIG. 7.

According to certain example embodiments, the method of FIG. 5 may include, at 500, receiving a quality of service policy and classification information of one or more packets of a quality of service flow. At 505, the method may include using a quality of service policy for handling the one or more packets of the quality of service flow based on the classification information to determine quality of service information. At 510, the method may also include sending the quality of service information to one or more network elements or user equipment for performing a per-packet adjustment of a quality of service parameter based on the quality of service information.

According to certain example embodiments, the method may also include enhancing the quality of service policy and the quality of service information to provide protocol data unit set granularity quality of service information indicating how the one or more packets are to be handled. According to further example embodiments, the protocol data unit set granularity may be one or more of a per media frame, a per group of pictures, a per temporal media layer, a per spatial media layer, and a per application. According to some example embodiments, one or more of the quality of service policy and classification information may be pre-configured, in the one or more network elements. According to other example embodiments, the quality of service information comprises one of priority level adjustment information of the one or more packets and priority levels for combinations of classification information. In certain example embodiments, the priority level adjustment information may include per protocol data unit set type adjustments to a reference priority level of the one or more packets. In some example embodiments, the priority level adjustment information may include a value that is added to the reference priority level, and a resultant sum of all adjustments to the reference priority may determine the priority of the one or more packets. In other example embodiments, the quality of service information may include a priority for combinations for each protocol data unit set media types.

Figure 6:
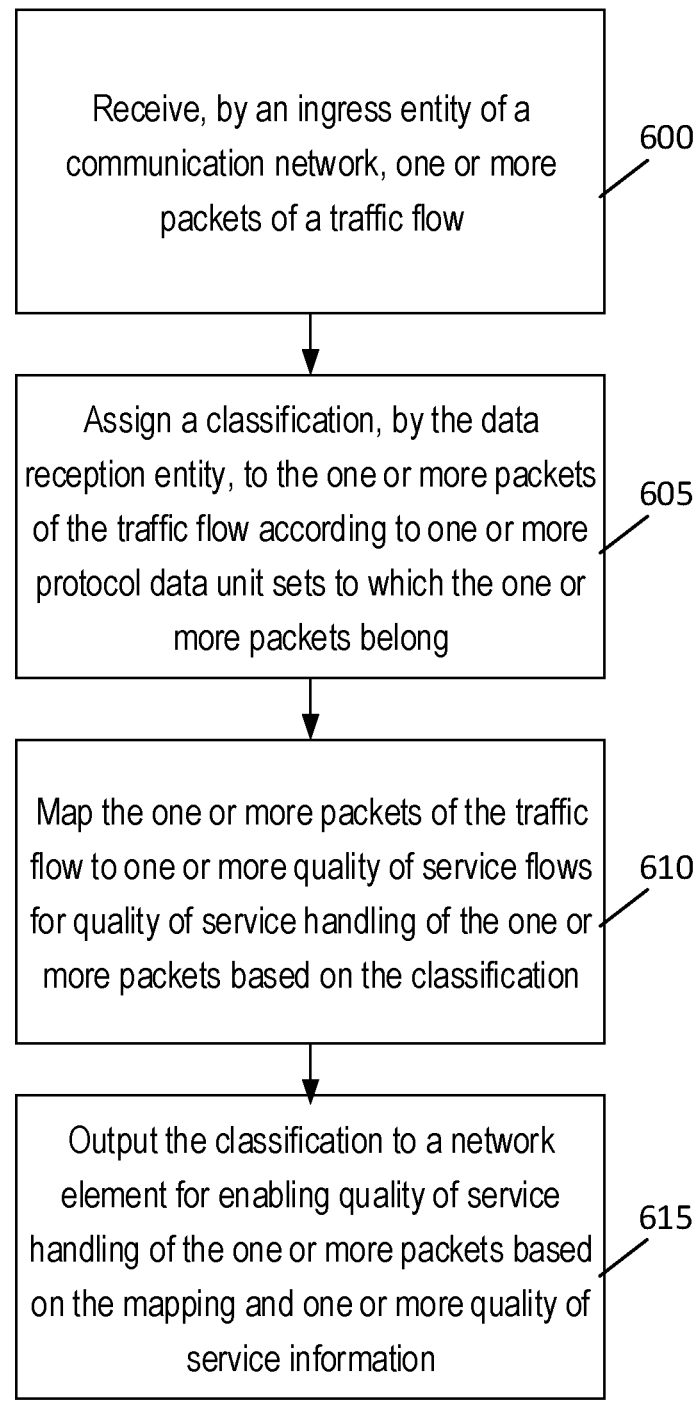
FIG. 6 illustrates an example flow diagram of another method, according to certain example embodiments.

FIG. 6 illustrates an example of a flow diagram of another method, according to certain example embodiments. In an example embodiment, the method of FIG. 6 may be performed by a network entity, or a group of multiple network elements in a 3GPP system, such as LTE or 5G-NR. For instance, in an example embodiment, the method of FIG. 6 may be performed by a UE, NG-RAN, UPF, or any other device similar to one of apparatuses 10 or 20 illustrated in FIG. 7.

According to certain example embodiments, the method of FIG. 6 may include, at 600, receiving, by a traffic ingress entity of a communication network, one or more packets of a traffic flow. At 605, the method may also include assigning a classification, by the data reception entity, to the one or more packets of the traffic flow according to one or more protocol data unit sets to which the one or more packets belong. At 610, the method may further include mapping the one or more packets of the traffic flow to one or more quality of service flows for quality of service handling of the one or more packets based on the classification. Additionally, at 615, the method may include outputting the classification to a network element for enabling quality of service handling of the one or more packets based on the mapping and one or more quality of service information.

According to certain example embodiments, the classification may identify which protocol data unit sets that the one or more packets belongs to, and identifies a membership of the one or more packets in each identified protocol data unit set. According to other example embodiments, the method may further include receiving, from a core network element, a quality of service information for handling the one or more packets based on the classification, and the mapping of the one or more packets of the traffic flow. According to some example embodiments, the method may also include performing a per-packet adjustment of one or more quality of service parameters based on the classification and quality of service information.

In certain example embodiments, the classification, may be determined based on the protocol data unit set instances to which the one or more packet belongs, and a protocol data unit set may be associated with application-level media unit attributes. In some example embodiments, the classification may be outputted via a general packet radio system tunneling protocol user plane tunnel header. In other example embodiments, the classification may be performed via media unit identification which may use techniques such as deep packet inspection, examination of real-time transport protocol extension headers, or machine learning to determine the application-level media unit attributes associated with a packet.

According to certain example embodiments, the method may also include applying the quality of service information to active queue management, discarding, scheduling, shaping, and transmission of the one or more packets based on the classification of the one or more packets. According to some example embodiments, the quality of service information and classification may include protocol data unit set granularity information indicating how the one or more packets are to be handled. According to other example embodiments, the quality of service information may include priority level adjustment information of the one or more packets according to packet classification indications. According to further example embodiments, when a packet of the one or more packets is associated with a plurality of protocol data unit sets, the assignment of the classification of the packet may include identifying each protocol data unit set of the plurality of protocol data unit sets with different application level attributes based on contents of the packet. In other example embodiments, the application-level media unit attributes may be one or more of media frame or slice type, media frame or slice dependency pointer to a specific media frame or slice instance or layer, frame or slice start or end marker, media temporal or spatial layer identifier, or application or media type.

Figure 7:
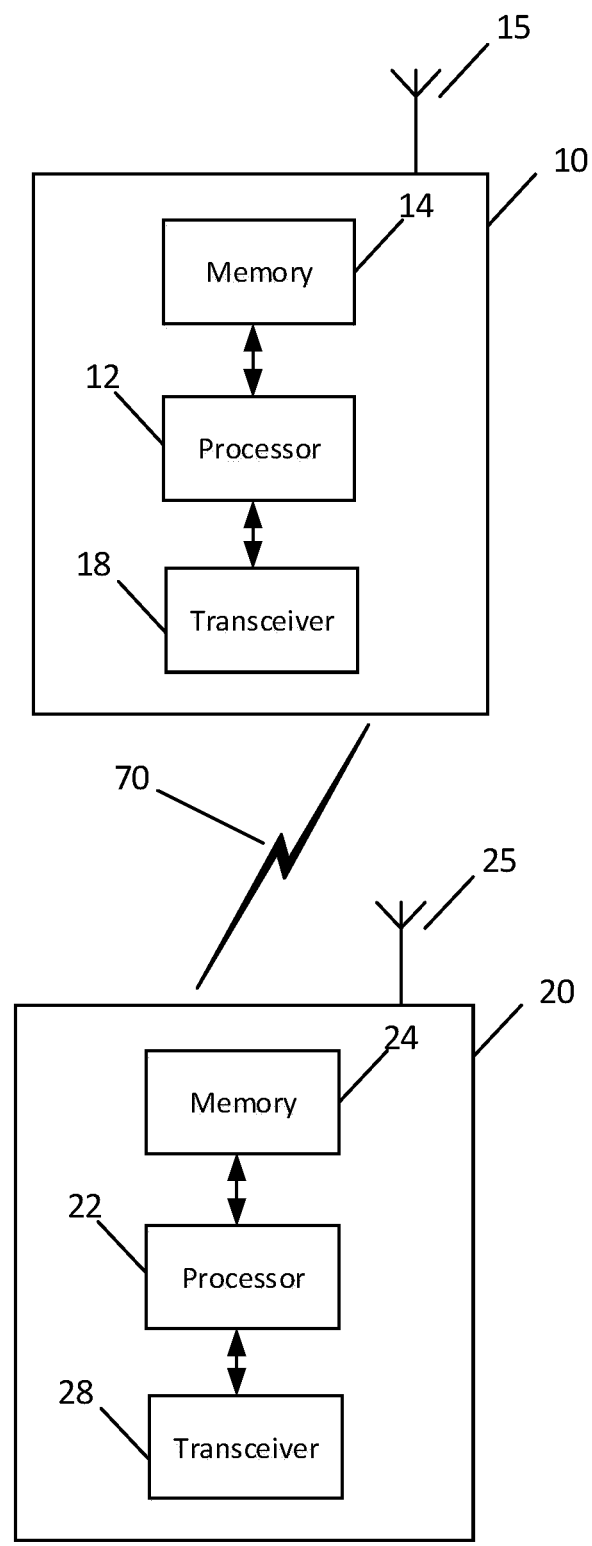
FIG. 7 illustrates a set of apparatuses, according to certain example embodiments.

FIG. 7 illustrates a set of apparatus 10 and 20 according to certain example embodiments. In certain example embodiments, the apparatus 10 may be a node or element in a communications network or associated with such a network, such as a UE, UPF, mobile equipment (ME), mobile station, mobile device, stationary device, IoT device, or other device. It should be noted that one of ordinary skill in the art would understand that apparatus 10 may include components or features not shown in FIG. 7.

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIGS. 1-4 and 6.

As illustrated in the example of FIG. 7, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-4 and 6.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-4 and 6.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to receive one or more packets of a traffic flow. Apparatus 10 may also be controlled by memory 14 and processor 12 to assign a classification, by the data reception entity, to the one or more packets of the traffic flow according to one or more protocol data unit sets to which the one or more packets belong. Apparatus 10 may further be controlled by memory 14 and processor 12 to map the one or more packets of the traffic flow to one or more quality of service flows for quality of service handling of the one or more packets based on the classification. In addition, apparatus 10 may be controlled by memory 14 and processor 12 to output the classification to a network element for enabling quality of service handling of the one or more packets based on the mapping and one or more quality of service information.

As illustrated in the example of FIG. 7, apparatus 20 may be a network, core network element, or element in a communications network or associated with such a network, such as gNB, SMF, PCF, or AF. It should be noted that one of ordinary skill in the art would understand that apparatus 20 may include components or features not shown in FIG. 7.

As illustrated in the example of FIG. 7, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-5.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-5.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

For instance, in certain example embodiments, apparatus 20 may be controlled by memory 24 and processor 22 to receive a quality of service policy and classification information of one or more packets of a quality of service flow. Apparatus 20 may also be controlled by memory 24 and processor 22 to use a quality of service policy for handling the one or more packets of the quality of service flow based on the classification information to determine quality of service information. Apparatus 20 may further be controlled by memory 24 and processor 22 to send the quality of service information to one or more network elements or user equipment for performing a per-packet adjustment of a quality of service parameter based on the quality of service information.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for receiving one or more packets of a traffic flow. The apparatus may also include means for assigning a classification, by the data reception entity, to the one or more packets of the traffic flow according to one or more protocol data unit sets to which the one or more packets belong. The apparatus may further include means for mapping the one or more packets of the traffic flow to one or more quality of service flows for quality of service handling of the one or more packets based on the classification. In addition, the apparatus may include means for outputting the classification to a network element for enabling quality of service handling of the one or more packets based on the mapping and one or more quality of service information.

Certain example embodiments may also be directed to an apparatus that includes means for receiving a quality of service policy and classification information of one or more packets of a quality of service flow. The apparatus may also include means for using a quality of service policy for handling the one or more packets of the quality of service flow based on the classification information to determine quality of service information. The apparatus may further include means for sending the quality of service information to one or more network elements or user equipment for performing a per-packet adjustment of a quality of service parameter based on the quality of service information.

Certain example embodiments described herein provide several technical improvements, enhancements, and/or advantages. For instance, in some example embodiments, the quality of XR media streams may be improved because application-level dependencies among packets are known when determining the quality of service to be provided a packet in the 5GS.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary:
3GPP 3rd Generation Partnership Project
5G 5th Generation
5GCN 5G Core Network
5GS 5G System
BS Base Station
DL Downlink
eNB Enhanced Node B
E-UTRAN Evolved UTRAN
gNB 5G or Next Generation NodeB
HO Handover
LTE Long Term Evolution
NR New Radio
PDU Protocol Data Unit
UE User Equipment
UL Uplink
XR Extended Reality

We claim:

1. A method, comprising:
receiving, by a user equipment, uplink packets of a traffic flow of an extended reality application from a fifth generation communication system;
assigning, by the user equipment, classifications to uplink packets of the traffic flow, wherein a respective uplink packet of the uplink packets of the traffic flow is assigned a classification of the classifications according to media specific information associated with the respective uplink packet, wherein the classification assigned to the respective uplink packet of the uplink packets of the traffic flow includes information that identifies one or more protocol data unit sets that the respective uplink packet belongs to, wherein in an instance a respective uplink packet of the uplink packets is associated with a plurality of protocol data unit sets, the assigning the respective classification to the respective uplink packet comprises;
mapping, by the user equipment, respective uplink packets of the uplink packets of the traffic flow to one or more quality of service (QOS) flows based on the one or more PDU sets the respective uplink packets belong to as identified by the classification assigned to the respective uplink packets;
receiving, by the user equipment, from a core network element, PDU set level quality of service parameters; and
performing, by the user equipment, PDU set integrated quality of service (QOS) handling of respective uplink packets of the respective QoS flows based on the respective classification assigned to each respective uplink packet, and the PDU set level QoS parameters.

2. The method according to claim 1, wherein the one or more PDU sets are associated with application-level media unit attributes.

3. The method according to claim 1, wherein the assigning comprises performing media unit identification and an analysis of the respective packets of the uplink packets of the traffic flow to determine the respective classifications for the respective uplink packets, wherein the analysis of a respective uplink packet of the uplink packets is performed using deep packet inspection, examination of real-time transport protocol extension headers of the respective uplink packet, or machine learning to determine the application-level media unit attributes associated with the respective uplink packet.

4. The method according to claim 1, wherein the performing PDU set integrated quality of service handling comprises:
applying, by the user equipment, the PDU set level quality of service parameters to active queue management, discarding, scheduling, shaping, or transmission of the uplink packets based on the respective classifications assigned to respective uplink packets of the uplink packets.

5. The method according to claim 1, wherein the PDU set level QoS parameters comprise priority level adjustment information for the respective uplink packets of the uplink packets according to the respective classifications assigned to the respective uplink packets.

6. The method according to claim 2, wherein the application-level media unit attributes comprise one or more of media frame type, media slice type, media frame dependency to a specific media frame, media slice dependency to a specific media slice instance or media layer, media frame start marker, media frame end marker, media slice start marker, media slice end marker, media temporal layer identifier, media spatial layer identifier, media application, or media type.

7. A user equipment comprising:
at least one processor; and
at least one memory comprising computer program code, wherein the computer code is configured to, when executed by the at least one processor, cause the at least to perform operations, the operations comprising:
receiving uplink packets of a traffic flow of an extended reality application from a fifth generation communication system;
assigning packet data unit (PDU) classifications to the uplink packets of the traffic flow, wherein a respective uplink packet of the uplink packets of the traffic flow is assigned a classification of the classifications according to media specific information associated with the respective uplink packet, wherein the classification assigned to the respective uplink packet of the packets uplink identifies one or more protocol data unit sets that the respective uplink packet belongs to, wherein in an instance a respective uplink packet of the uplink packets is associated with a plurality of protocol data unit sets, the assigning the respective classification to the respective uplink packet comprises;

mapping respective uplink packets of the uplink packets of the traffic flow to one or more quality of service (QOS) flows based on the one or more PDU sets the respective uplink packets belong to as identified by the classification assigned to the respective uplink packets; and receiving, from a core network element, PDU set level quality of service parameters; and performing PDU set integrated quality of service (QOS) handling of respective uplink packets of the respective QoS flows based on the respective classification assigned to each respective uplink packet, and the PDU set level QoS parameters.

8. The user equipment according to claim 7, wherein the operations further comprise:

performing media unit identification of the respective uplink packets to generate the media specific information associated with the respective uplink packets, wherein the media unit identification of a respective uplink packet of the uplink packets is performed using deep packet inspection of the respective uplink packet, examination of real-time transport protocol extension headers of the respective uplink packet, or machine learning to determine the application-level media unit attributes associated with the respective uplink packet.

9. The user equipment according to claim 7, wherein when a respective uplink packet of the uplink packets is associated with a plurality of protocol data unit sets, the classification is assigned to the respective uplink packet by:

identifying each protocol data unit set of the plurality of protocol data unit sets with different application level attributes based on contents of the respective uplink packet.

10. The user equipment according to claim 7, wherein the one or more PDU sets are associated with application-level media unit attributes.

11. The user equipment according to claim 7, wherein the performing the PDU set integrated quality of service handling comprises:

applying the PDU set level quality of service parameters to active queue management, discarding, scheduling, shaping, or transmission of the packets based on the respective classifications assigned to respective uplink packets of the uplink packets.

12. The user equipment according to claim 7, wherein the PDU set level QoS parameters comprise priority level adjustment information for the respective uplink packets of the uplink packets according to the respective classifications assigned to the respective uplink packets.

13. The user equipment according to claim 10, wherein the application-level media unit attributes comprise one or more of media frame type, media slice type, media frame dependency to a specific media frame, media slice dependency to a specific media slice instance or media layer, media frame start marker, media frame end marker, media slice start marker, media slice end marker, media temporal layer identifier, media spatial layer identifier, media application, or media type.

* * * * *